United States Patent [19]

Piatt

[11] Patent Number: 4,626,869

[45] Date of Patent: Dec. 2, 1986

[54] INK JET WET-STORAGE SYSTEM

[75] Inventor: Michael J. Piatt, Enon, Ohio

[73] Assignee: Eastman Kodak Company, Rochester, N.Y.

[21] Appl. No.: 722,551

[22] Filed: Apr. 12, 1985

[51] Int. Cl.[4] .............................................. G01D 15/18

[52] U.S. Cl. .................................. 346/75; 346/140 R

[58] Field of Search .............................. 346/75, 140 R

[56] References Cited

U.S. PATENT DOCUMENTS 4,223,324 9/1980 Yamamori et al. ............ 346/140 R 4,231,046 10/1980 Aiba ..................................... 346/75

4,300,145 11/1981 van Raamsdonk ............ 346/140 R 4,417,259 11/1983 Maeda ............................ 346/140 R

*Primary Examiner*—E. A. Goldberg

*Assistant Examiner*—Gerald E. Preston

*Attorney, Agent, or Firm*—John D. Husser

[57] ABSTRACT

An ink jet printing apparatus includes elements for capillary support of ink in a region adjacent the orifice plate and lower print head structure and elements for selectively enclosing that region from the atmosphere. Elements for selectively removing ink from the capillary support region are provided.

22 Claims, 5 Drawing Figures

INK JET WET-STORAGE SYSTEM

BACKGROUND OF THE INVENTION

1. Field of the Invention

The present invention relates to ink jet printing apparatus, e.g. of the continuous type, which has lower print head structure, and more specifically to a structural and functional system that provides an improved storage mode for such apparatus.

2. Description of the Prior Art

The term "continuous" has been used in the field of ink jet printer apparatus to characterize the types of ink jet printers that utilize continuous streams of ink droplets, e.g. in distinction to the "drop on demand" types. Continuous ink jet printers can be of the binary type (having "catch" and "print" trajectories for droplets of the continuous streams) and of the multi-deflection type (having a plurality of print trajectories for droplets of the continuous streams). Binary type apparatus most often employs a plurality of droplet streams while multi-deflection apparatus most often employs a single droplet stream.

In general, continuous ink jet printing apparatus have an ink cavity to which ink is supplied under pressure so as to issue in a stream(s) from an orifice plate in liquid communication with the cavity. Periodic perturbations are imposed on the liquid stream(s), e.g. vibrations by an electromechanical transducer, to cause the stream(s) to break up into uniformly sized and shaped droplets. A charge plate is located proximate the stream(s) break-off point to impart electrical charge in accord with a print information signal and charged droplets are deflected from their nominal trajectory. In one common binary printing apparatus, charged droplets are deflected into a catcher assembly and non-charged droplets proceed along their nominal trajectory to the print medium.

The components described above (particularly the orifice plate and charge plate) should be precisely sized and positioned to achieve accurate placement of droplets on the print medium or catcher face. However, even after such careful manufacture, significant problems often are presented when the apparatus is shutdown for extended periods (e.g. overnight). That is, ink residue which remains from previous usage, will often dry on the orifice and charge plate structure during such shut-down periods. If the residue is in the orifice plate it can cause crooked jets. If residue is on the charge plate it can cause shorting or improper charging of droplets. Excessive residue on the other lower print head structure (e.g. the catcher) can cause disturbance in the droplet flight.

One approach for obviating the residue problem is for the operator to physically clean away the residue; however, this is not desirable for an office-environment printer. Also, operator cleaning often requires moving the charge plate, which is undesirable from the viewpoint of maintaining precise alignment.

Prior art solutions attempting to avoid operator cleaning have involved (i) providing a nearly instantaneous negative pressure at the shut-down of ink flow to avoid forming the residue on the charge plate and lower print head structure; (ii) purging the ink cavity and orifice plate with cleaning solution and/or air during a start-up or shut-down cycle; and (iii) providing a rapid pressure pulse in the image bar at start-up to force an initially straight start of the ink jets. These solutions are all helpful in avoiding ink residue problems without operator cleaning, but they are not without related difficulties and disadvantages. For example, introducing air or cleaning solution into the ink system adds considerable complexity to the apparatus and creates an additional operative cycle at shut-down and/or start-up. The "water-hammer" approach for achieving instantaneous start-up of the jets requires an extremely fast-actuation solenoid valve and rigid conduits, and it is sometimes unreliable in configurations where jet-to-electrode spacings are small. The instant shut-down procedure adds complexity to the fluid handling system and also can be unreliable.

SUMMARY OF THE INVENTION

One significant purpose of the present invention is to provide for ink jet printing apparatus an improved system that avoids the operational problems connected with residue upon critical components without the necessity for operator cleaning and without the disadvantages of prior art approaches. To achieve this purpose the present invention proceeds on a thesis that differs from the above-described approaches in several basic aspects. First the present invention provides a system wherein the critical components of the print head assembly (e.g. the ink cavity, orifice plate and charge plate) are stored in a wet condition. In preferred embodiments, start-up is effected with a gradual increase of ink pressure and the resultant instability of ink streams utilized in cleaning of the print head assembly. In such embodiments, the present invention provides means for removing residual wet ink when the ink jet streams have moved into a not-impacting relation with the charge plate assembly.

Thus, in one aspect the present invention provides in continuous ink jet printing apparatus of the type having a print head with an orifice for producing ink streams and a charge plate located proximate the nominal path of such ink stream, means for supporting ink within a region encompassing the operative portion of both the orifice and charge plates and means for sealing that region from the ambient atmosphere. In a preferred configuration, the supporting means comprises wall means, located on the opposite side of nominal ink path from the charge plate to form, in cooperation with orifice and charge plates, a region that is contiguous the operative surfaces of said orifice and charge plates and that will support ink liquid against gravitational force by capillary forces. In a further preferred configuration the sealing means comprises a chamber located adjacent the apparatus print path, and the invention provides means for selectively removing wet ink from the lower print head portions.

DESCRIPTION OF THE DRAWINGS

The subsequent description of preferred embodiments of the present invention refers to the attached drawings wherein.

DETAILED DESCRIPTION OF PREFERRED EMBODIMENTS

Figure 1:
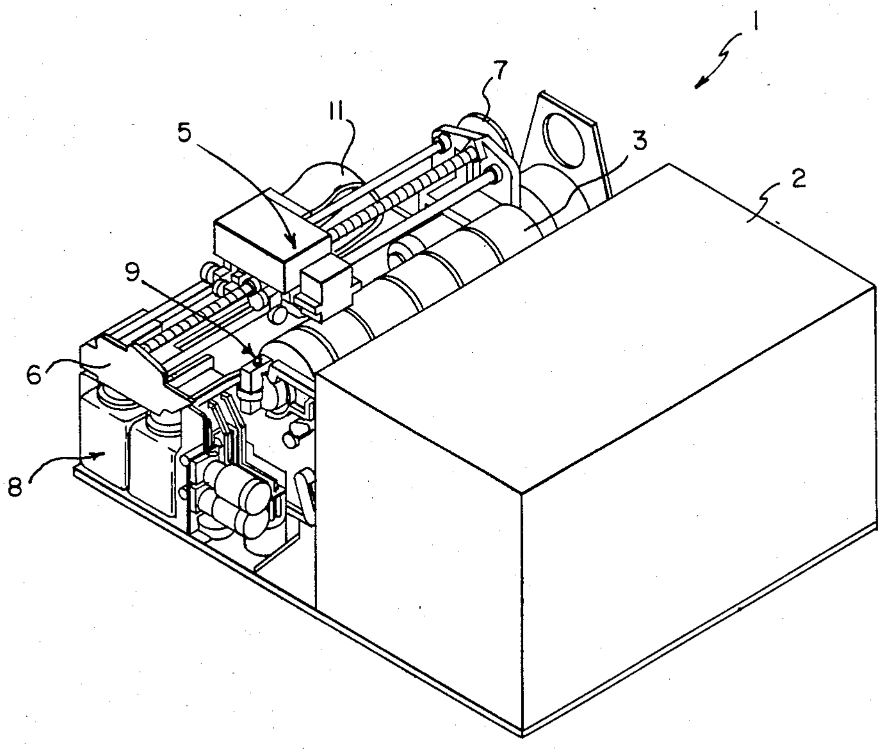
FIG. 1 is a perspective view of one embodiment of ink jet printing apparatus in accord with the present invention.

FIG. 1 illustrates schematically an exemplary ink jet printing apparatus 1 employing one embodiment of the present invention. In general, the apparatus 1 comprises a paper feed and return sector 2 from which sheets are transported into and out of operative relation on printing cylinder 3. The detail structure of the sheet handling components does not constitute an essential part of the present invention and need not be described further.

Also illustrated generally in FIG. 1 is a print head assembly 5 which is mounted for movement on carriage assembly 6 by appropriate drive means 7. During printing operation the print head assembly is traversed across a print path in closely spaced relation to a print sheet which is rotating on cylinder 3. Ink is supplied to and returned from the print head assembly by means of flexible conduits 11 which are coupled to an ink cartridge(s) 8. A storage and start-up station 9 is constructed adjacent the left side (as viewed in FIG. 1) of the operative printing path of print head assembly 5; and the drive means 7 and carriage assembly 6 are constructed to transport particular portions of the print head assembly into operative relations with station 9 at appropriate sequences of the operative cycle of apparatus 1, as will be described in more detail subsequently.

Figure 2:
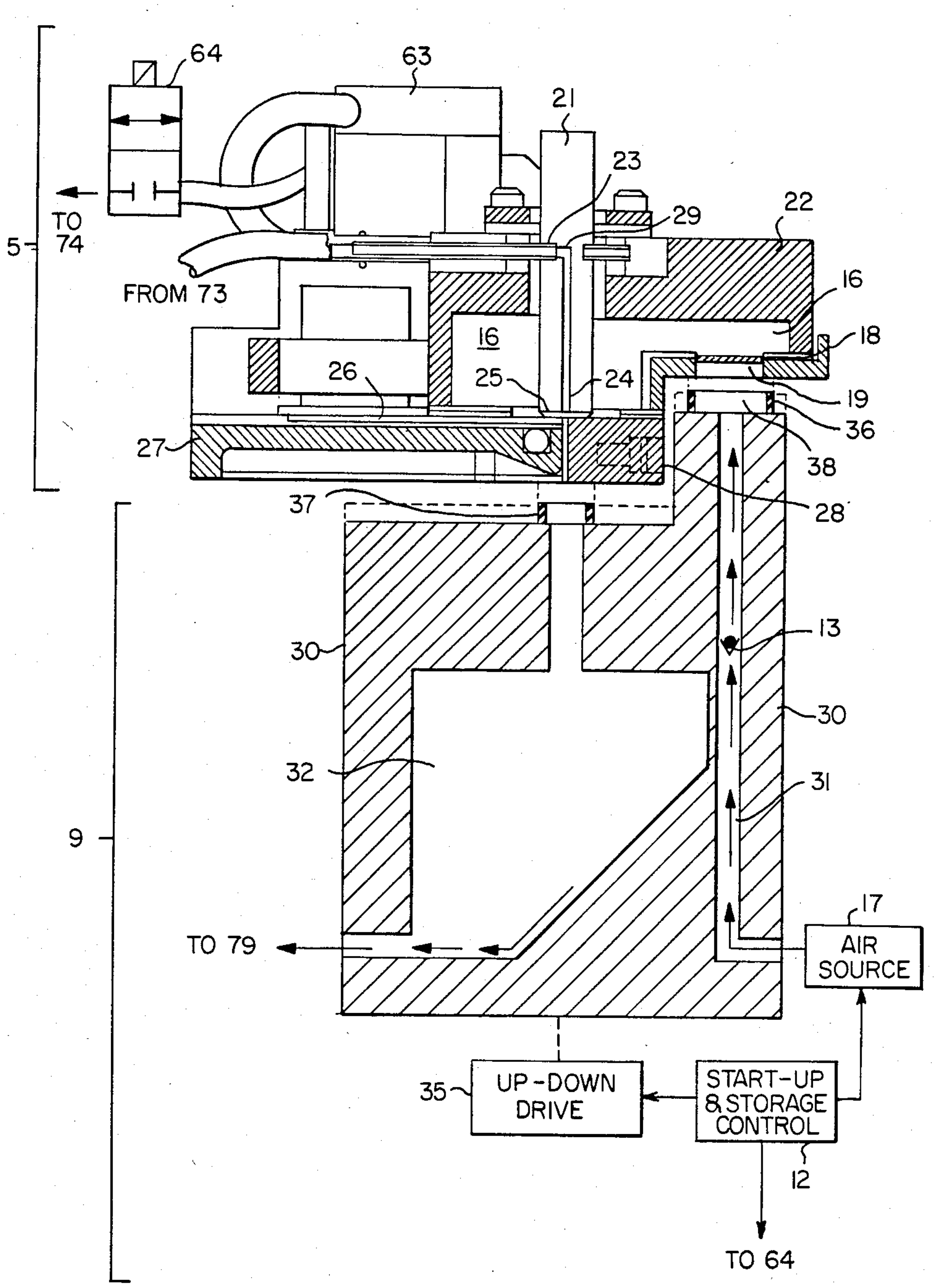
FIG. 2 is a schematic cross-sectional view of a portion of the FIG. 1 apparatus illustrating the upper and lower print head assemblies and their cooperative relation within the storage and start-up station.

Referring to FIG. 2, one embodiment of print head assembly 5 according to the present invention can be seen in more detail. The assembly 5 includes an upper print head portion including a print head body 21 mounted on housing 22 and having an inlet 23 for receiving ink. The body 22 has a passage leading from inlet 23 to one end of print head cavity 24 and an outlet 29, leading from the other end of the cavity 24 to the ink circulation system. The upper print head portion also includes an orifice plate 25 and suitable transducer means (not shown) for imparting mechanical vibration to the body 21 and orifice plate 25. Such transducer can take various forms known in the art for producing periodic perturbations of the ink filament(s) issuing from the orifice plate 25 to assure the break-up, adjacent charge plate 26, of the ink filaments into streams of uniformly spaced ink droplets. Several preferred constructions for the print head body and transducer are disclosed in U.S. application Ser. No. 390,105, entitled "Fluid Jet Print Head" and filed June 21, 1982 in the name of Hilarion Braun; however, a variety of other constructions are useful in accord with the present invention. Preferred orifice plate constructions for use in accord with the present invention are disclosed in U.S. Pat. No. 4,184,925; however, a variety of other orifice constructions are useful.

The lower portion of print head assembly 5 includes a charge plate 26 constructed to impart desired charge upon ink droplets at the point of filament break-up and a droplet catcher device 27 that is constructed and located to catch non-printing droplets (in this arrangement charged droplets). Exemplary preferred charge plate constructions are disclosed in U.S. application Ser. No. 517,608, entitled "Molded Charge Electrode Structure" and filed July 27, 1983 in the name of W. L. Schutrum and in U.S. Pat. No. 4,223,321; however, other charge plate constructions are useful in accord with the present invention. Exemplary catcher configurations are described in U.S. Pat. Nos. 3,813,675; 4,035,811 and 4,268,836; again other constructions are useful. Finally, in accord with the present invention, lower print head assembly includes a predeterminedly configured and located wall member 28 that defines a printing outlet region and a capillary passage between the orifice plate 25 and the outlet region. This structure constitutes an important aspect of the present invention and will be described in much more detail subsequently.

The ink circulation system of the FIG. 1 apparatus includes various ink conduits (i.e. lines) which form an ink recirculation path. As illustrated schematically in FIG. 3, pump inlet line 71 extends from ink supply cartridge 8 to the inlet of pump 60, outlet line 72 extends between pump 60 and a main filter 69, head supply line 73 extends from main filter 69 to the print head inlet 23 and head return line 74 extends from the print head outlet 29 to a junction between catcher return line 75 and the main ink return line 76. An ink return line 79 also extends from start-up and storage station 9 to cartridge 8. An air bleed line 78 extends from main filter 69 back to cartridge 8 and an ink bypass line 77 extends from a juncture with line 73 also back to cartridge 8. As will be clear from the subsequent description, the present invention is not limited to use with the particular ink circulation line arrangement illustrated in FIG. 3. Likewise other elements of the FIG. 3 circulation system, such as ink heater 61, variable flow restrictor 62, final filter 63, temperature sensor(s) 65 and pressure sensor 66 are not necessary for the practice of the present invention, but can be usefully incorporated with it.

Figure 3:
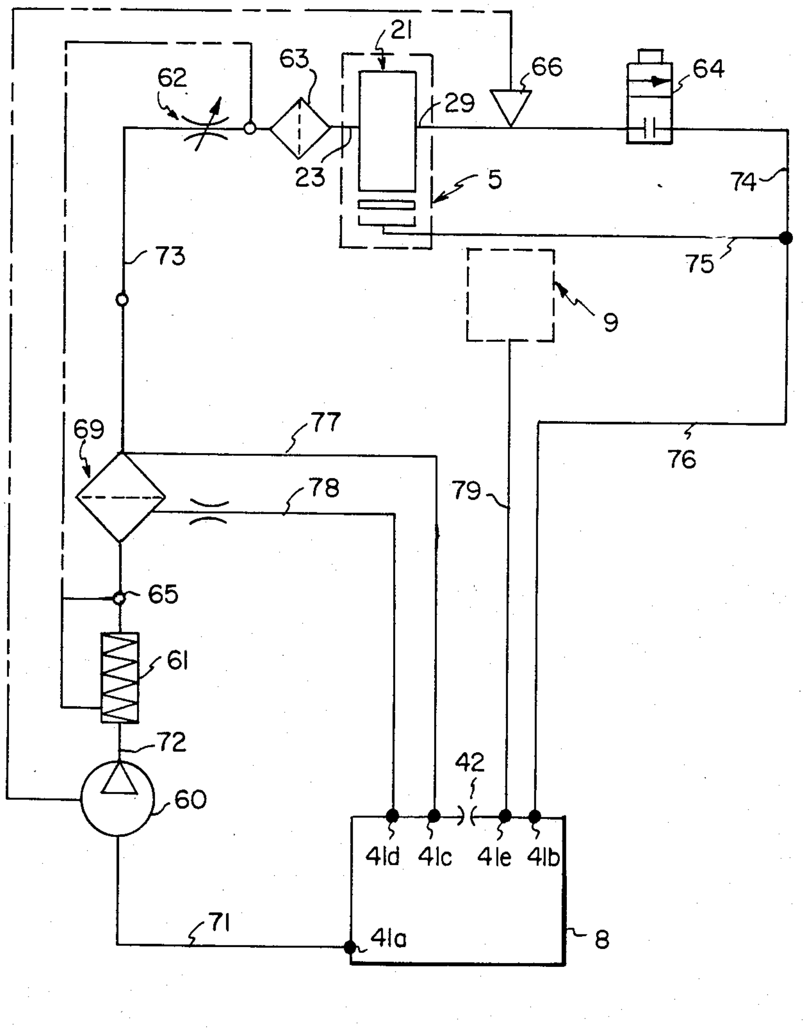
FIG. 3 is a diagrammatic illustration of the ink supply system of the apparatus shown in FIG. 1.

As shown in FIGS. 1 and 3, cartridge 8 can be constructed to be readily inserted and removed, as a unit, from operative relation with lines of the ink circulation system. For this purpose suitable couplings 41*a*, 41*b*, 41*c*, 41*d* and 41*e* are formed on the cartridge 8 in a manner so as to operatively connect respectively with lines 71, 76, 77, 78 and 79 upon insertion of the ink cartridge 8 into its mounting in the printer apparatus. Cartridge 8 can have a vent 42 to render its main ink reservoir portion at atmospheric pressure. The cartridge can comprise, as unitary portions, a prefilter (not shown), which is located between coupling 41*a* and the cartridge interior to filter ink egressing to pump inlet 71, and a venturi portion (not shown) which is constructed to: (i) receive ink from bypass line 77 at a venturi inlet (ii) receive ink from line 76 proximate the venturi restriction region and (iii) introduce those ink flows to the atmospheric region of the cartridge interior through a venturi expansion region above the liquid surface.

Further details of the structure and function of cartridge 8 are described in copending U.S. application Ser. No. 722,548, entitled "Ink Supply Cartridge and Cooperative Ink Circulation System of Continuous Ink Jet Printer", and filed Apr. 12, 1985, in the names of J. McCann, M. Piatt and T. Williams. However, the present invention can be equally well utilized in a circulation system utilizing a separate vacuum pump to withdraw ink from the return lines back to the cartridge.

In general, during a start up mode of operation, a solenoid valve 64 in the head outlet line 74 is open and pump 60 is activated to withdraw ink from the cartridge 8 through line 71. Ink is forced under pressure through the main filter and into head inlet line 73 and bypass line 77. The ink passing into inlet line 73 flows through the print head and into and through the head outlet line 74. The ink passing into bypass line is circulated back into the cartridge 8, and when cooperating with a cartridge having a venturi, provides a motive force for withdrawing ink back into return line 76.

Heater 61, under the feedback control of sensor 65, conditions the circulating ink to the proper operating temperature and pressure sensor 66 regulates pump 60 to attain the proper dynamic line circulation pressure. The valve 64 in head outlet line 74 is operable to effect flow regulation and can be utilized to regulate the fluid pressure in the cavity 24 of the print head and thus the rate of ink jet flow through the print head orifices. When valve 64 is completely open ink flows through the print head cavity without exiting from the print head orifices and when it is completely closed ink passing into the print head 20 issues as ink streams of nominal velocity from the orifice plate of the print head. The flow of ink through bypass line continues in the printing mode and, in the venturi embodiment, provides the motive force for withdrawal of ink from catcher 30 along lines 75, 76. The venturi motive force could also be used to remove ink from line 79.

Referring again to FIG. 2, the storage and start-up station 9, in accord with the present invention, comprises a housing 30 having an ink sump 32 formed therein and sealing means 36 and 37. The housing 30 is located adjacent the printing path of print head assembly so that the print head assembly can be moved to the cooperative position overlying the housing (as shown in FIG. 2) by the translational drive means 7 described with respect to FIG. 1. The housing embodiment shown in FIG. 2 is movable between the dotted-line and solid-line positions (toward and away from the print head assembly), e.g. by up-down drive 35; however, various other arrangements to provide the desired interrelations between the storage and start-up station 9 and print head assembly 5 will occur to one skilled in the art.

As shown in FIG. 2, the sealing means 36 and 37 of housing 30 are constructed and located to seal the interface and the print head assembly 5. Thus housing 30 provides a chamber that encloses the catcher, charge plate and orifice plate from the surrounding atmosphere when the housing is in the upper (dotted-line position). The ink sump 32 is aligned to receive ink issuing from the orifice plate during start-up and shut-down modes of operation.

FIG. 2 also illustrates the housing 30 as embodying one preferred means for effecting removal of ink liquid from the operational surfaces of the charge plate 26. Thus, an air conduit 31 has an outlet 38 that is aligned with an air inlet opening 18 in the print head assembly. The opening 18 is covered by an air filter 19, which is adapted to filter air passing from outlet 18, from a pressure source 17, prior to its passage into the cavity 16, which leads to the orifice and charge plate region of the print head assembly. A ball valve 13 is biased to a normally closed position in air conduit 31 (to maintain the enclosure around the charge and orifice plate region) and is actuated to an open position by the pressure of the air from source 17 when the air source is on.

The structural and functional details of the apparatus thus far described will be further understood by the following description of how it operates in accordance with the present invention under the control of start-up and storage control 12, which can be, e.g., a portion of a microprocessor system (not shown) that controls the overall operation of apparatus 1. Thus, commencing the operational description in the course of a normal printing operation sequence, print head assembly 5 is traversing across the print cylinder 3 and ink is flowing in a plurality of stabilized droplet streams from orifice plate 25, past charge plate 26. Charge is imparted to droplets by charge plate 26 in accordance with a printing information signal and non-charged drops pass to the print medium, while charged drops are deflected into catcher 27. At this stage valve 64 is closed and ink is circulating from the catcher 27 back to cartridge 8, as described with respect to FIG. 3.

Figure 4:
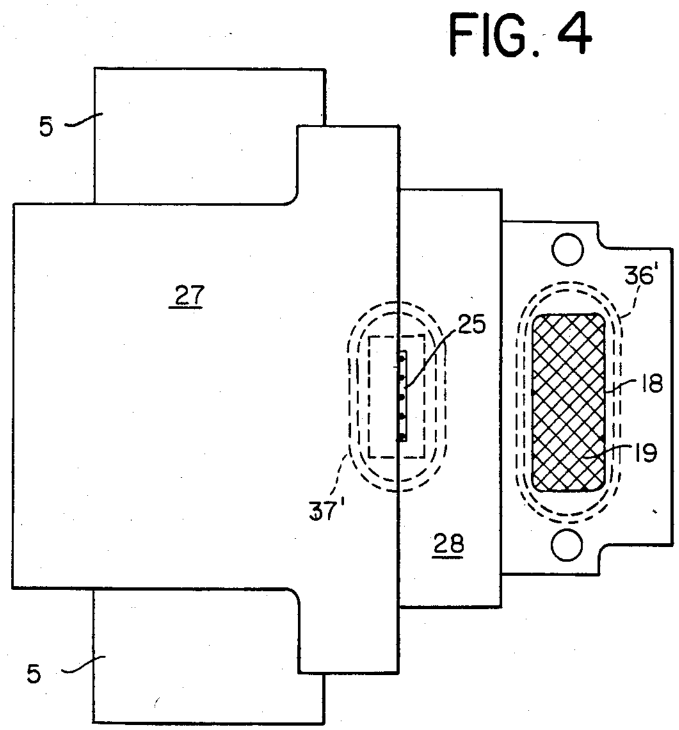
FIG. 4 is a schematic bottom view of a portion of the print head assembly shown in FIGS. 2.

When it is desired to change apparatus 1 from a printing or standby condition to a storage condition (e.g. for an overnight period), an appropriate command is transmitted to control 12. In response to this command, the start-up and storage control signals drive 7 to translate the print head assembly to the position over the storage and start-up station 9 as shown in FIG. 2 (solid lines), with the charge plate operating in a catch-all-drops mode. The drive 35 is next actuated to move housing 30 into the dotted-line position shown in FIG. 2, whereby the seals 36 and 37 are forced into sealing engagement around the periphery of air inlet 18 and the printing outlet region defined by the lower surfaces of catcher 27 and wall means 28. This sealing engagement is illustrated schematically in FIG. 4, which is a bottom plan illustration of one suitable print head assembly and wherein dotted lines 36' and 37' illustrate the region of sealing engagement that encloses air inlet 18 and the printing outlet region. The space surrounding print head assembly's orifice and charge plates and catcher therefore are sealed from the external atmosphere.

Figure 5:
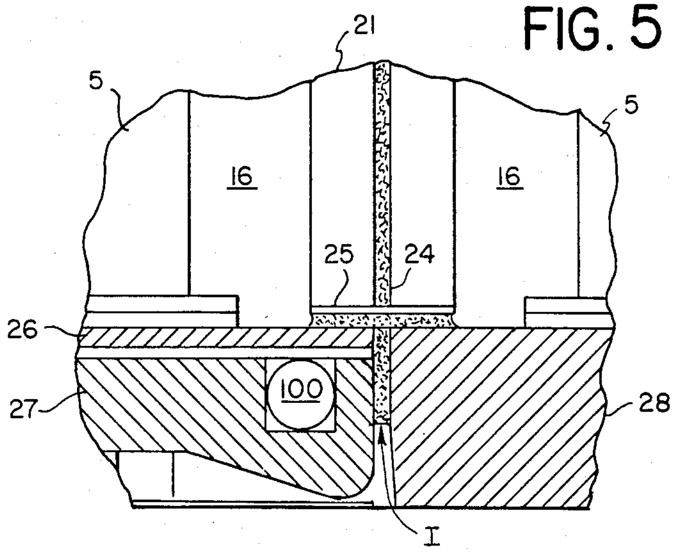
FIG. 5 is an enlarged cross-sectional view of a portion of the print head assembly shown in FIG. 2.

Next, valve 64 is opened until ink flows only through the cavity outlet 29. During the opening of valve 64 the pressure in cavity 24 gradually decreases and passes through a condition where ink is only weeping through orifice plate 25. The ink that weeps through the orifice plate is transported and held by capillary forces in a region defined by the surfaces of the charge and orifice plates 26 and 25 and opposing surfaces of catcher 27 and wall means 28. The details of a preferred structural configuration to provide such capillary support region are illustrated in the enlarged schematic view of FIG. 5, wherein the supported ink is denoted I.

One skilled in the art will appreciate that the degree of filling of the region surrounding the orifice and charge plates and catcher surface can be controlled by the spacing of wall means 28. However, the extent of filling of this region is also affected by the linearity of the cessation of the flow through the orifices and it is desirable that the valve 64 be opened gradually to avoid transient ink pressure pulses and achieve good filling of the capillary region. In the preferred embodiment illustrated, ink is supported under the entire orifice plate and adjacent the charge plate 26 and portions of the face of catcher 27.

After the valve 64 has been so opened, the ink supply pump 60 is shut off, in a gradual fashion similar to the opening of valve 64, and the operative surfaces of the orifice and charge plate are stored in a wet condition with the entire fluid system full of ink, rather than air. Also, the space surrounding capillary ink region contiguous operative surfaces of the charge plate, orifice plate and catcher is thus sealed in a high vapor atmosphere so that ink drying is significantly obviated. As shown in FIG. 2 it is preferred that the sump 32 be coupled directly to the ink reservoir region and this further enhances maintenance of a humid environment around the capillary ink region, further negating evaporation and drying.

An exemplary start-up cycle of apparatus 1, preparatory to recommencing of printing operations, begins with the apparatus in the storage condition just described. Upon receipt of an appropriate start-up command, control 12 actuates pump 60 and heater 61 to circulate and heat ink with valve 64 in an open condition. After the ink has reached proper temperature, valve 64 is closed to initiate ink flow through the orifices of plate 25. It is preferred, but not necessary, to initially close valve 64 only to an extent that causes ink to spray from orifice plate 25 in non-stable streams that impact upon the surfaces of the charge plate 26 and catcher 27. This cleans those surfaces and dissolves any ink that may have partially dried upon the surfaces.

In accordance with the present invention it is desirable to provide means for removing the wet ink (i.e. the capillary supported ink and/or the ink sprayed during start-up) from the charge plate prior to the initiation of printing operations. This can be accomplished after the printing jets have achieved a stabilized condition by various means. For example, means 100 (FIG. 5) located proximate the charge plate can be a vacuum port or heater adjacent the charge plate 26 which withdraw or thermally remove the ink. Alternatively the storage and start-up station 9 can be provided with a vacuum probe or a fibrous wiping means to clear the charge plate of wet ink with the jets in their stabilized printing trajectories. However, it is preferred to utilize the ink removal means shown in FIG. 2, which is the subject of, and described in detail in concurrently filed U.S. application Ser. No. 722,545, entitled "Ink Jet Printing Apparatus Having an Improved Start-Up System", which is incorporated herein by reference for that preferred mode of ink removal.

Generally, in accord with that preferred mode for removing the wet ink from the charge plate, control 12 actuates air source 17 to introduce a pressurized air flow through conduit 31, air filter 19 and cavity 16 into the region of the orifice and charge plates. The wall member 28 is constructed so that the passage formed between the charging surfaces of the charge plate 26 and the upper portion of opposing wall 28 restricts the air flow from source 17 and the velocity of air through that passage is high, e.g. ten times that of the ink jet velocity. The high velocity air flow past the charge plate 29 and catcher surface 28 pushes the residual ink off of the charge plate and catcher surfaces. Both the pressurized air and entrapped ink pass into sump 32 of the home station and back to the reservoir of cartridge 8 through line 79. When using a venturi type cartridge it is preferred that the line 79 be separate from return line 76 so that the high velocity air flow is not impeded by the cartridge venturi. In such an embodiment, sump is located above the cartridge 8 so that gravity will effect ink return. In embodiments where a separate vacuum pump is utilized rather than the venturi, for ink return, lines 79 and 76 can be coupled.

In accord with the above-described preferred mode of ink removal, it has been found preferable to commence the high velocity air flow at about the same time ink jets are actuated to their nominal pressure. This is because removing the ink as a sheet gains assistance from the ink viscosity and is more reliable than removing small ink heads (which form if air is not supplied before the ink is running in a non-spray condition).

After the charge plate has been dried by the air flow, the air source 17 is shut off, the transducer is actuated and drop charging commences in a catch-all-drops mode. The print head assembly is now in the same operating condition in which is was moved into the storage and start-up station and is ready to be moved back along the printing path for printing operation.

Although the present invention has been described with respect to continuous ink jet printing apparatus, it can be employed to advantage also with other types of ink jet printers (e.g. drop-on-demand printers) to the extent they have lower print head structure (e.g. drop steering or catching structure) that should be protected from ink residue.

The invention has been described in detail with particular reference to preferred embodiments thereof, but it will be understood that variations and modifications can be effected within the spirit and scope of the invention. For example, the wall means that cooperates with the operative structure of the print head assembly to provide the capillary ink support region can be formed as a portion of the storage and start-up station. In such an embodiment, the movement of the print head assembly to that station would properly align the wall means vis-a-vis its cooperative print head structure.

What is claimed is:

1. In continuous ink jet printing apparatus of the type having a print head with an ink cavity, a multi-orifice plate in fluid communication with said cavity, means for supplying ink to said cavity to produce streams of ink droplets from said orifice plate and a charge plate including an array of charge electrodes located along one side of the nominal path of such droplet streams respectively adjacent individual ones of such droplet streams, the improvement comprising:

(a) wall means, located on the opposite side of said nominal path from said charge plate, for forming, with said orifice and charge plates, a capillary region that is contiguous the operative surfaces of said orifice and charge plates wherein ink liquid is supportable against gravitational force by capillary forces; and (b) means for sealing said region from the surrounding atmosphere.

2. The invention defined in claim 1 wherein said orifice plate, said charge plate and said wall means are constructed for movement as a unit within said apparatus relative to said sealing means.

3. The invention defined in claim 2 further comprising a drop catcher assembly which is movable as a unit with said orifice and charge plates and wherein said sealing means is constructed to also seal said drop catcher assembly from the surrounding atmosphere.

4. The invention defined in claims 1, 2 or 3 wherein said sealing means is located at a storage station within said apparatus and wherein said orifice and charge plates and said wall means are movable as a unit between said storage station and a printing zone spaced within said apparatus from said storage station.

5. The invention defined in claim 4 wherein said storage station includes air supply means for introducing pressurized air into said capillary region.

6. The invention defined in claim 1, 2 or 3 further including air supply means actuatable for introducing pressurized air into said capillary region.

7. In continuous ink jet printing apparatus of the type having a print head assembly including (i) an ink cavity, (ii) a multi-orifice plate, (iii) ink supply means for providing ink to said cavity to produce printing streams of ink droplets from said orifice plate and (iv) a charge plate including a linear array of selectively addressable charge electrodes, located on one side of the droplet stream path, for selectively charging droplets of respective streams, the improvement comprising:

(a) wall means located on the opposite side of the droplet stream path from said charge plate for supporting a liquid ink mass surrounding the surfaces of said orifice and charge electrodes by cooperative capillary support with those surfaces; and (b) means for sealing such liquid ink mass from the surrounding atmosphere.

8. The invention defined in claim 7 wherein sealing means is located at storage station of said apparatus and said print head assembly and said wall means are constructed for movement as a unitary structure between said storage station and a printing zone of said apparatus.

9. The invention defined in claim 8 comprising means for providing sealing and non-sealing relative movement between said print head assembly and said sealing means within said storage station.

10. The invention defined in claim 7 further comprising a drop catcher assembly which is movable with said print head assembly and wherein said sealing means is constructed to also seal said drop catcher assembly from the surrounding atmosphere.

11. In continuous ink jet printing apparatus of the type having a print head with an ink cavity, a multi-orifice plate in fluid communication with said cavity, means for supplying ink to said cavity to produce streams of ink droplets from said orifice plate and a charge plate including a linear array of charge electrodes located on one side of the nominal path of such droplet streams and a drop catcher extending along said one side of said nominal path as a continuation of said charge plate, the improvement comprising:

(a) wall means, extending along the opposite side of said nominal path from said charge plate and said catcher, for forming, with said orifice and charge plates and said catcher, a capillary region for supporting ink in a manner surrounding the orifice and electrode surfaces and at least a portion of the catcher surface; and (b) means for enclosing said capillary region from the surrounding atmosphere.

12. The invention defined in claim 1 wherein said print head and said wall means are constructed for movement as a unitary structure within said apparatus relative to said enclosing means.

13. The invention defined in claims 11 or 12 wherein said enclosing means is located at a storage station within said apparatus and wherein said print head and said wall means are movable between an operative relation with said storage station and a printing zone of said apparatus.

14. The invention defined in claim 13 wherein said storage station include air supply means for introducing high velocity air into said capillary region.

15. The invention defined in claim 11 or 12 further including means actuatable for introducing high velocity air through said capillary region in a direction generally along said nominal ink stream path.

16. In continuous ink jet printing apparatus of the type having a print head assembly including an ink cavity, a multi-orifice plate, a droplet-charging plate having an array of charge electrodes, a droplet catcher formed as an extension of said electrode array and ink supply means for providing pressurized ink to said cavity, the improvement comprising:

(a) wall means for supporting a liquid ink mass in a manner surrounding the surfaces of said orifices and charge electrodes and in contact with at least a portion of said catcher; and (b) means for enclosing such a supported ink mass from the surrounding atmosphere.

17. The invention defined in claim 16 wherein enclosing means is located at storage station of said apparatus and said print head assembly and said wall means are constructed for movement as a unitary structure between said storage station and a printing zone of said apparatus.

18. The invention defined in claim 1 or 11 further comprising control means for operating said ink supply means to fill said capillary support region with ink from said cavity.

19. The invention defined in claim 13 wherein said storage station is coupled to an apparatus ink supply zone so that the region enclosed by said enclosing means is coupled to the environment of said ink supply zone.

20. The invention defined in claim 4 wherein said storage is coupled to an apparatus ink supply zone so that the region sealed by said sealing means is coupled to the environment of said ink supply zone.

21. The invention defined in claim 1, 7, 11 or 16 further comprising means for adjusting said apparatus between a first condition wherein ink streams from said orifice plate pass along a nominal printing path and a second condition wherein ink streams from the orifice plate impact said charge plate.

22. The invention defined in claim 7 or 17 further comprising means for adjusting said apparatus between a first condition wherein ink streams from said orifice plate pass along a nominal printing path and a second condition wherein ink streams from the orifice plate impact said charge plate.

* * * * *